US012595019B2

(12) United States Patent
Dorr et al.

(10) Patent No.: US 12,595,019 B2
(45) Date of Patent: Apr. 7, 2026

(54) DEVICE FOR TOWING A TOWED BICYCLE WITH A TOWING BICYCLE

(71) Applicants:Christian Dorr, Weitra (AT); Petra Dorr, Weitra (AT)

(72) Inventors: Christian Dorr, Weitra (AT); Petra Dorr, Weitra (AT)

( * ) Notice: Subject to any disclaimer, the term of this patent is extended or adjusted under 35 U.S.C. 154(b) by 377 days.

(21) Appl. No.: 18/196,232

(22) Filed: May 11, 2023

(65) Prior Publication Data

US 2023/0391417 A1      Dec. 7, 2023

(30) Foreign Application Priority Data

Jun. 1, 2022    (AT) ............................... A 50388/2022

(51) Int. Cl.
B62K 27/12              (2006.01)
(52) U.S. Cl.
CPC ................................... B62K 27/12 (2013.01)
(58) Field of Classification Search
CPC ....... B62K 13/02; B62K 27/12; B62K 13/025
See application file for complete search history.

(56) References Cited

U.S. PATENT DOCUMENTS

| | | | | |
|---|---|---|---|---|
| 4,325,564 | A * | 4/1982 | Phipps ................. | B62K 27/006 |
| | | | | 280/492 |
| 8,360,456 | B2 * | 1/2013 | Peruzzo ................. | B62K 27/12 |
| | | | | 280/402 |
| 2006/0066075 | A1 * | 3/2006 | Zlotkowski ............. | B60P 3/125 |
| | | | | 280/402 |
| 2015/0266537 | A1 | 9/2015 | Lee | |

FOREIGN PATENT DOCUMENTS

| | | | | | |
|---|---|---|---|---|---|
| DE | 9405806 | U1 * | 9/1994 | ............. | B62K 27/12 |
| DE | 20005839 | U1 | 7/2000 | | |
| DE | 10159547 | C1 | 6/2003 | | |
| DE | 2020018102191 | U1 | 7/2019 | | |
| EP | 0589480 | A1 * | 3/1994 | ............... | B62H 1/02 |
| EP | 0825100 | A2 * | 2/1998 | ............. | B62K 27/12 |
| EP | 1318070 | A2 * | 6/2003 | ............. | B62K 27/12 |
| GB | 2280410 | A | 2/1995 | | |
| GB | 2310175 | A | 8/1997 | | |

OTHER PUBLICATIONS

Translation of DE 9405806 U1 (Year: 1994).*
Espacenert English Abstract for DE 10159547 C1, Jun. 18, 2003.

* cited by examiner

*Primary Examiner* — Valentin Neacsu
*Assistant Examiner* — Hosam Shabara
(74) *Attorney, Agent, or Firm* — Tiajoloff & Kelly LLP

(57)              ABSTRACT

A device for towing a towed bicycle with a towing bicycle comprises a frame attachment (1) for the towing bicycle, a carrier (2) connected to the frame attachment (1), the carrier comprising a hub holder (4) for the front wheel hub of the towed bicycle. In order to enable safe towing of a towed bicycle without modifying it, whereby the towing position can be established as simply as possible and driving safety during towing is impaired as little as possible, the carrier (2) forms a tire support (3) for the tire of the front wheel of the towed bicycle and the hub holder (4) comprises a hub support (5) for the front wheel hub and a hub stop (6) engaging behind the front wheel hub on the side facing away from the tire support (3).

17 Claims, 3 Drawing Sheets

DEVICE FOR TOWING A TOWED BICYCLE WITH A TOWING BICYCLE

FIELD OF THE INVENTION

The invention relates to a device for towing a towed bicycle with a towing bicycle, comprising a frame attachment for the towing bicycle, a carrier connected to the frame attachment and comprising a hub holder for the front wheel hub of the towed bicycle.

BACKGROUND OF THE INVENTION

The prior art is comprises a variety of devices for towing a towed bicycle with a towing bicycle, wherein the device is mounted on the towing bicycle to tow the towed bicycle without a rider. DE10159547C1 shows such a device, which is mounted in the area of the rear wheel hub of the towing bicycle and has a fork open against the towing direction. The child's bicycle to be towed has fastening nuts attached to the front wheel hub, which can be positively inserted into lockable clamps arranged at the end portions of the fork. In this towing position, the child's bicycle is locked via the front wheel hub, although the front wheel can still rotate freely within the fork.

However, a disadvantage of the prior art is, on the one hand, that the wheel to be towed must be equipped with the fastening nuts and, on the other hand, that the clamps must be fixed via screws or other fastening means in order to be able to tow the towed bicycle. This means that it must be known in advance which bicycle is to be towed and that towing at short notice, for example in the event of an accident, is not possible. For this purpose, on the one hand, the bicycle to be towed must first be converted and, on the other hand, the tools required for closing the fastening nuts must be carried along. Although DE10159547C1 discloses embodiments in which the clamps can be closed manually, it is questionable whether, in particular in a stressful situation such as heavy traffic or an accident, the clamps can thereby be closed safely by the user.

SUMMARY OF THE INVENTION

The invention is thus based on the task of enabling safe towing of a towed bicycle without modifying it, whereby the towing position can be established as simply as possible and driving safety during towing is impaired as little as possible.

The invention solves the given problem in that the carrier forms a tire support for the tire of the front wheel of the towed bicycle and the hub holder comprises a hub support for the front wheel hub and a hub stop engaging behind the front wheel hub on the side facing away from the tire support. As a result of these measures, the front wheel of the towed bicycle is raised and arranged so that it is supported at three points on the device: one support is provided by the hub holder on the side facing away from the tire support, i.e., as viewed from the rider of a towing bicycle, behind the front wheel hub. The second support is provided below the front wheel hub, as this rests on the hub support, which means that the front tire is no longer in contact with the ground. And the third support is at the tire support, against which the front tire is fixed. This also raises the towed bicycle during towing and supports it against forces acting both in and against the direction of travel. The hub holder is spaced from the tire support in such a way that the front tire is fixed between the hub holder and the tire support due to its round shape and the acting gravity, which also hinders unintentional displacement of the towed bicycle in another direction. Depending on its deformability, the front tire can be elastically compressed to a greater or lesser extent in the area of the tire support during this immobilization according to the invention and exerts a counterforce on the tire support, which further stabilizes the immobilization position. Due to the fixed position, the handlebar of the towed bicycle cannot be moved independently of the towing bicycle, so that the towed bicycle cannot tilt when cornering and thus cannot cause the towing bicycle to wobble. However, the towed bicycle can automatically follow a change in direction of the towing bicycle, since only the front wheel is fixed, but not the steering. The device is preferably arranged on the frame of the towing bicycle in such a way that the center of gravity of the towed bicycle is as low as possible, but safe cornering of the towing bicycle is still ensured. In the simplest case, the hub holder can be a pin projecting from the carrier so that the towed bicycle can simply be hooked into the device from above along the longitudinal axis of the pin.

Although undesirable lateral slippage of the front wheel of the towed bicycle is already largely prevented by fixing the front wheel, lateral slippage out of the device can be stopped if the carrier forms a fork in the region of the tire support for laterally securing the front wheel of the towed bicycle. In this case, the fork base forms the tire support from which the fork arms extend in the direction of the front wheel of the towed bicycle. Thus, if the front wheel should rotate due to external forces, the fork arms serve as a lateral stop to limit the deflection of this rotational movement. Since the torque in the front wheel is highest in the area of the front tire, the carrier only has to form a fork according to the invention in the area of the tire support in order to laterally fix the front wheel.

To prevent the front tire from slipping sideways out of the device and at the same time keep the weight of the device as low as possible, the fork may have two fork arms, the length of the fork arm comprising the hub holder exceeding the length of the other fork arm by at least twice. The hub holder is arranged on the long arm, the minimum length of which depends on the diameter of the front tire of the towed bicycle. The short arm is long enough to form a stop for the front wheel, or more preferably the front tire, so that the front wheel is laterally fixed. Since the front wheel contacts the short arm first in the area of the fork base anyway in the event of an unintended twist, this arm can be kept relatively short, thereby reducing the overall weight of the device. If the length of the fork arm comprising the hub holder exceeds the length of the other fork arm by at least double, this effect according to the invention can be ensured for a wide range of tire diameters.

In order to prevent the front wheel of the towed bicycle from tilting transversely to the direction of travel, the fork may have stop plates on its side facing the front wheel of the towed bicycle for laterally securing the front wheel of the towed bicycle. Even if the effect of the device according to the invention already results if the fork has a flat cross-section in the area of the tire support, such a flat fork may not be able to absorb forces caused by lateral tilting due to its geometry in such a way that tilting is completely prevented and damage to the front wheel of the towed bicycle is avoided. However, the stop plates have contact surfaces that protrude from the fork, allowing such forces to be absorbed over a larger area and introduced into the device without causing the towed bicycle to tip.

In order to distance the towed bicycle from the towing bicycle also during towing in such a way that the use of the luggage carrier or a possibly existing child seat on the towing bicycle is not impaired, it is proposed that a fork arm of the fork is connected to the frame attachment on the side opposite the hub holder at an end portion extended beyond the tire support. As a result of these measures, the distance between the front wheel of the towed bicycle and the towing bicycle is co-determined by the dimensions of the extended end portion. In this way, it can be prevented in a structurally simple manner that the handlebar or other parts of the towed bicycle are located directly in the area of the luggage carrier or child seat during towing. Furthermore, the area in which the front wheel of the towed bicycle is stored is spatially separated from the frame attachment, which results in easier accessibility to both.

In order to easily adapt the device to different tire diameters of the towed bicycle with unimpaired operation, it is proposed that the hub holder has a longitudinal guide in which the hub stop is slidably and fixably mounted. This allows the distance between the hub stop and the tire support to be varied, effectively fixing tires of different diameters. Furthermore, the hub holder can optionally be pushed further towards the tire support after it engages behind the front wheel hub of the towed bicycle before it is fixed. In this way, the locking force applied to the front wheel can be adjusted independently of the tire diameter, the weight of the towed bicycle, the riding conditions, etc. In a particularly simple embodiment, the hub holder may have an elongated hole along which the hub stop is slidably and fixably mounted.

The invention also relates to a towing bicycle with a device according to the invention, in which the frame attachment is connected to the chain stay. This allows easy attachment of the device while maintaining a low center of gravity of the towed bicycle during towing. Due to the elongated geometry of the chain stay, the device can be easily attached to at least two points of the chain stay without the high torques that occur during towing placing a high mechanical load on the device.

Particularly simple mounting conditions result when the frame attachment is connected to the bicycle stand retainer of the chain stay. Since such rear stand retainers are usually standardized, as in the case of KSA 40 or KSA 18 stand retainers, for example, the frame attachment does not have to be adapted to a wide range of bicycle types but can, for example, simply engage in the standardized holes of the stand retainer and be mounted there in addition to the bicycle stand.

Riding safety can be further increased by simple design means, with the carrier running parallel to the chain stay. As a result of these measures, the fixing forces on the front wheel of the towed bicycle in and against the direction of travel are in force equilibrium when the towing speed is constant. This reduces the likelihood that the locking of the front wheel will loosen or weaken, for example, when the ground becomes uneven. Further, this allows for a relatively low center of gravity of the towed bicycle, which in addition to increasing riding safety, also increases riding comfort for the rider of the towing bicycle. Further, this allows for easy attachment of the device to the towing bicycle, particularly when the frame attachment is located on an end portion of a fork arm of the carrier that extends beyond the tire support.

BRIEF DESCRIPTION OF THE DRAWINGS

In the drawing, the subject matter of the invention is shown, for example. It shows FIG. 1 a side view of a towing bicycle with a device according to the invention, which tows a child's bicycle as a towed bicycle, FIG. 2 a partial view of FIG. 1 showing the rear wheel of the towing bicycle, the device according to the invention and the front wheel of the towed bicycle in enlarged scale, and FIG. 3 a top view of a device according to the invention with the front wheel of the towed bicycle fixed in place, on an even larger scale.

DETAILED DESCRIPTION

Figure 1:
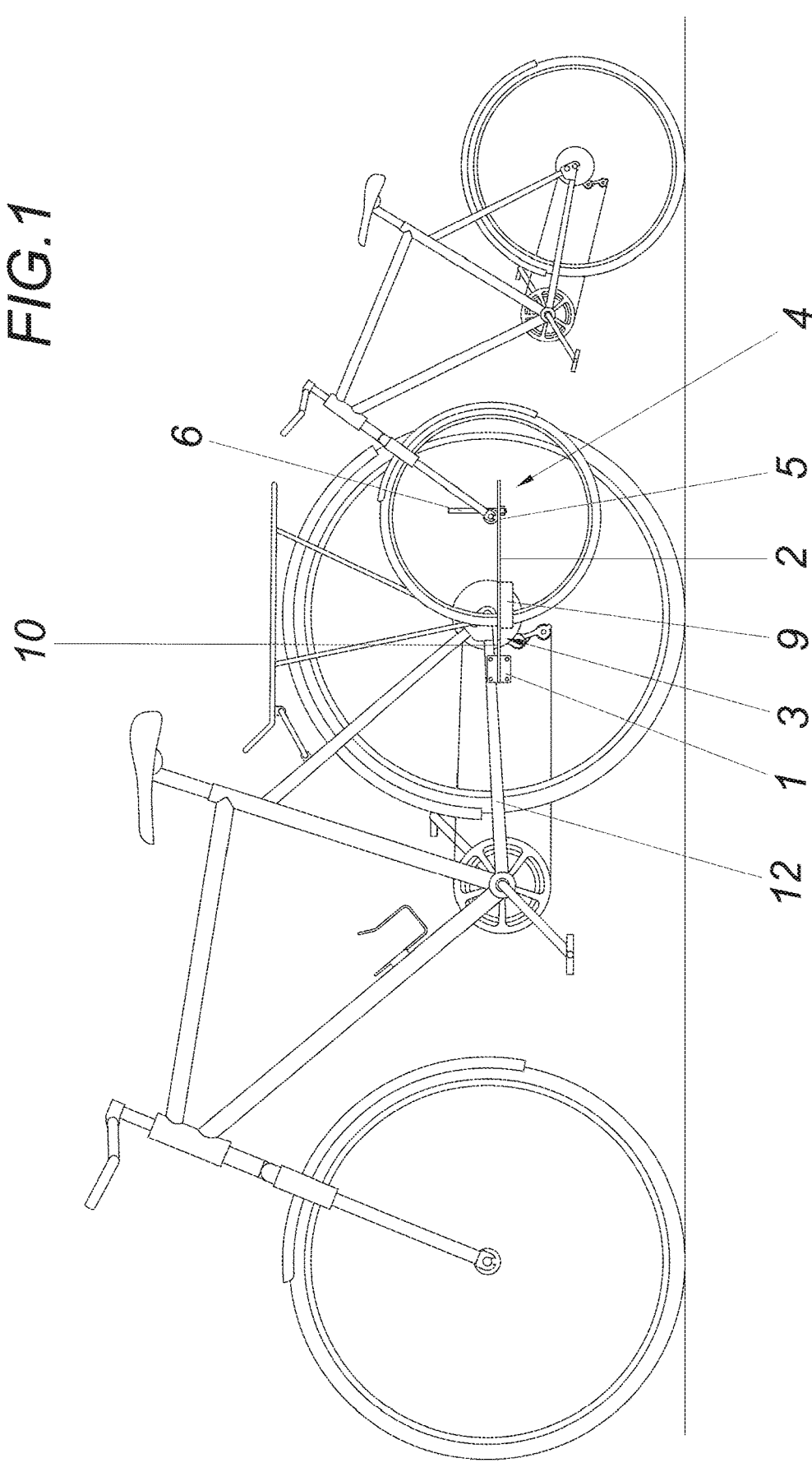

A device according to the invention for towing a towed bicycle with a towing bicycle comprises a frame attachment 1, by means of which the device can be attached to the towing bicycle, and a carrier 2 connected to the frame attachment 1. By means of the frame attachment 1, the movements of the towing bicycle are transmitted into the device and transmitted to the towed bicycle via the latter. The carrier 2 also has a tire support 3 and a hub holder 4 for the front wheel hub of the towed bicycle, between which the front tire of the towed bicycle is fixed. In order to achieve this fixation, the front wheel is arranged on the carrier 2 in such a way that the front tire of the front wheel rests on the tire support 3 and the front wheel hub rests on a hub support 5 of the carrier. Depending on the material of the front tire and its inflation, the front tire not only rests on the hub support 5, but can also be elastically compressed to a greater or lesser extent in the area of the tire support 3 and exert a counterforce on the tire support 3, which further stabilizes the fixed position. Furthermore, the front wheel hub is engaged behind on its side facing away from the tire support 3 by a hub stop 6, which is also part of the hub holder 4. For towing, the front wheel of the towed bicycle is thus raised and arranged on the carrier, with the tire support 3 forming a stop for forces against the direction of travel, the hub support 5 preventing the front wheel from touching the ground and the hub stop 6 forming a stop for forces in the direction of travel. Due to the force of gravity and its round shape, the front wheel is thus already fixed in the carrier when the hub stop 6 and the tire support 3 are suitably spaced apart, and this without the towed bicycle having to be mechanically modified. As a result of these measures, the towed bicycle can automatically follow a change in direction of the towing bicycle, since only the front wheel is fixed, but not the steering.

Figure 3:
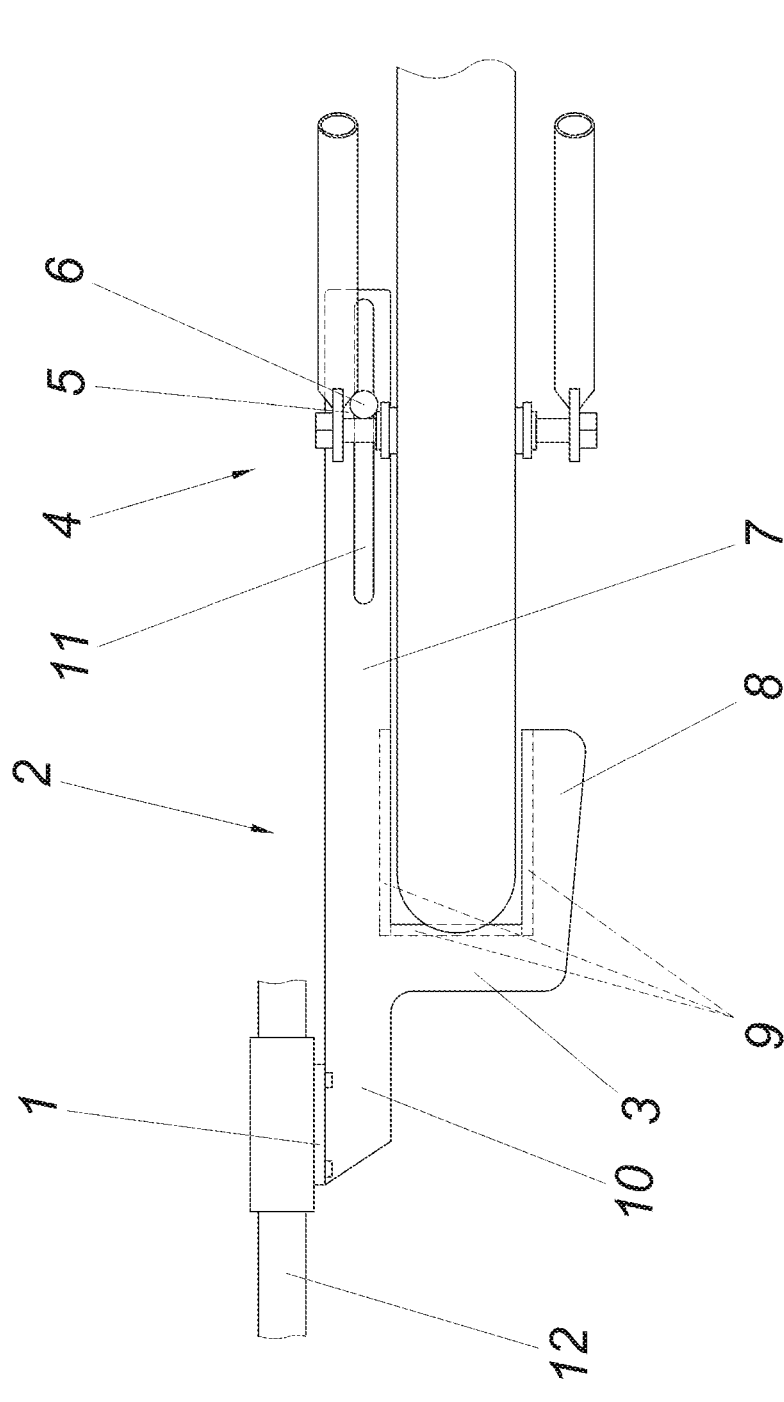

These locking forces may not be sufficient to prevent the front wheel of the towed bicycle from loosening and slipping due to driving conditions. However, the carrier 2 can form a fork in the area of the tire support 3, whereby the front wheel is also fixed laterally, since the fork arms 7, 8 form a stop for the front wheel transversely to the direction of travel. For this purpose, it is sufficient that the carrier 2 forms a fork in the area of the tire support 3, since the moments acting on the front wheel are highest there in the area of the front tire. As can be seen in FIG. 3, the length of a fork arm 7 is determined by the required distance between tire support 3 and hub stop 6, which is why this fork arm 7 in the embodiment shown is longer than the second fork arm 8, which only has to absorb the moments acting on the front wheel and can therefore be shorter. In principle, the front wheel of the towed bicycle can be fixed in such a way that it is also secured against tipping over. However, since excessively high fixing forces can have a negative effect on the front wheel, the front wheel can also be secured against these tipping forces by stop plates 9 arranged on the side of the fork facing the front wheel of the towed bicycle. These stop plates can absorb tipping forces acting on the towed bicycle over a larger area and transmit them into the device.

A fork arm 7 of the fork may have an end portion 10 extended beyond the tire support 3 on the side opposite the hub holder 4, which is connected to the frame attachment 1. With this end portion 10, the frame attachment 1 is spaced from the tire support 3, making the frame attachment 1 more easily accessible. Furthermore, via this spacing, the distance between the front wheel of the towing bicycle and any luggage rack, child seat, etc. on the towing bicycle can be increased, thereby facilitating its accessibility or usability as well.

The hub holder 4 can have a longitudinal guide 11 in which the hub stop 6 is mounted so as to be displaceable and fixable. On the one hand, this allows the device to be adapted to different tire diameters of the towed bicycle and, on the other hand, allows the clamping forces to be adjusted. After the hub stop 6 engages behind the front wheel hub of the towed bicycle, it can be pushed further in the direction of the tire support 3 and can only be fixed when the desired fixing force is reached. In the embodiment shown, the longitudinal guide is an elongated hole, as shown in FIG. 3.

Figure 2:
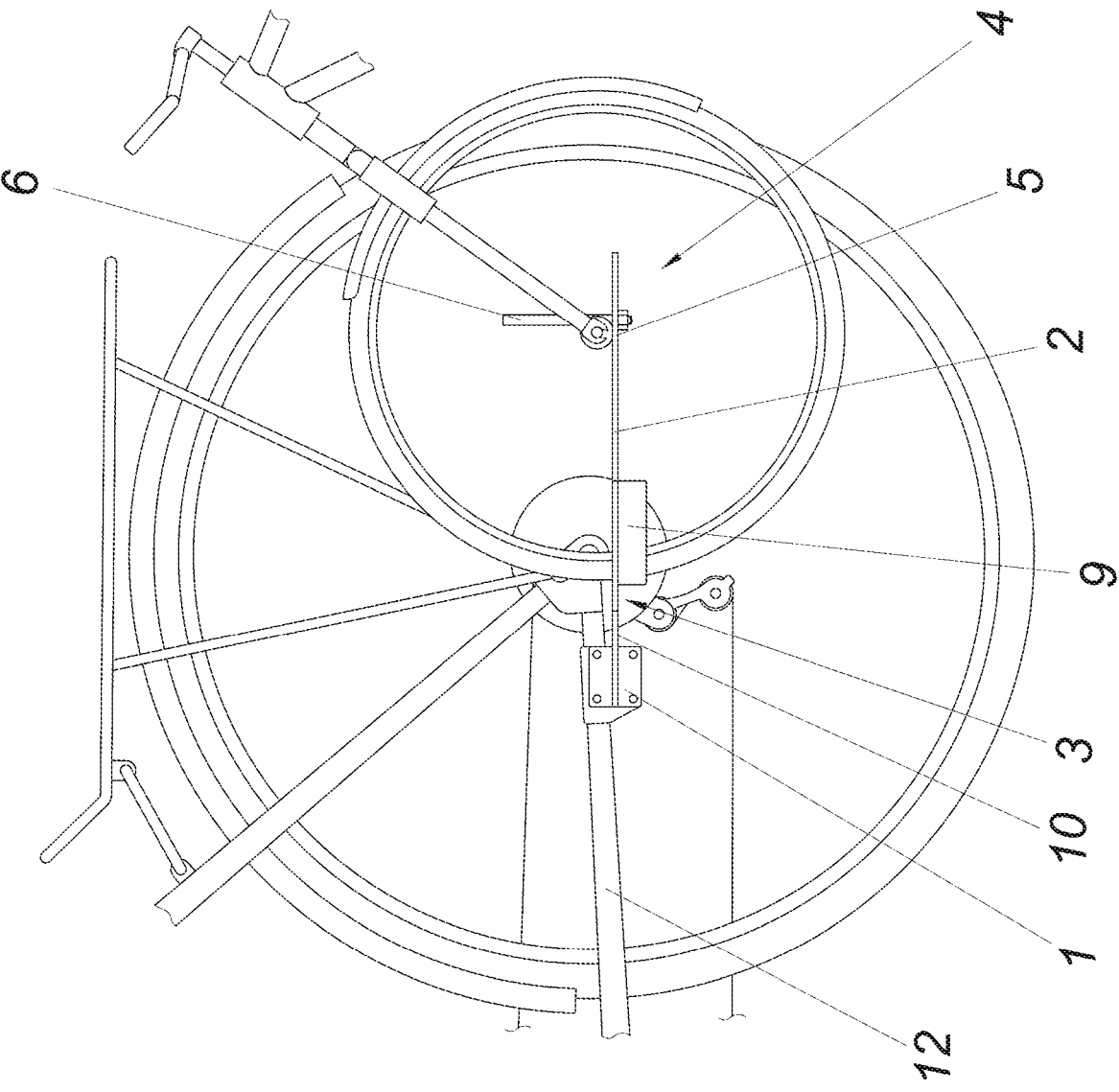

The frame attachment 1 is preferably connected to the chain stay 12 of the towing bicycle, as shown in FIGS. 1 and 2. This makes it easy to arrange the device on the towing bicycle in such a way that the front wheel hub of the towed bicycle is at the same height as the rear wheel hub of the towing bicycle, which has a positive effect on the riding behavior during towing. To this end, the frame attachment can preferably be such that it can be attached to the stand retainer of the chain stay 12. If the carrier 2 is arranged parallel to the chain stay 12 as shown, this results in a particularly stable arrangement of the front wheel of the towed bicycle during towing.

What is claimed is:

1. A device for towing a towed bicycle with a towing bicycle, said device comprising:
 a frame attachment configured for connection with the towing bicycle;
 a carrier connected to the frame attachment and comprising a hub holder configured to connect with a front wheel hub of a front wheel of the towed bicycle;
 wherein the carrier forms a tire support configured to support a tire of the front wheel of the towed bicycle with the tire of the front wheel of the towed bicycle engaging and resting on the tire support; and
 wherein the hub holder includes a hub support configured to support the front wheel hub and a hub stop adapted to engage behind the front wheel hub on a side thereof facing away from the tire support.

2. The device according to claim 1, wherein the carrier forms a fork in a region of the tire support configured to laterally secure the front wheel of the towed bicycle.

3. The device according to claim 2, wherein a fork arm (7) of the fork is connected to the frame attachment on a side opposite the hub holder at an end portion that extends beyond the tire support.

4. The device according to claim 2, wherein the hub holder has a longitudinal guide in which the hub stop is slidably supported so as to be fixably mounted in a selected position.

5. The device according to claim 1, wherein the hub holder has a longitudinal guide in which the hub stop is slidably supported so as to be fixably mounted in a selected position.

6. A towing bicycle with a device according to claim 1, wherein the frame attachment is connected to a chain stay of the towing bicycle.

7. The towing bicycle according to claim 6, wherein the frame attachment is connected to a bicycle stand retainer of the chain stay.

8. The towing bicycle according to claim 7, wherein the carrier runs parallel to the chain stay.

9. The towing bicycle according to claim 6, wherein the carrier runs parallel to the chain stay.

10. A device for towing a towed bicycle with a towing bicycle, said device comprising:
 a frame attachment configured for connection with the towing bicycle;
 a carrier connected to the frame attachment and comprising a hub holder configured to connect with a front wheel hub of a front wheel of the towed bicycle;
 wherein the carrier forms a tire support configured to support a tire of the front wheel of the towed bicycle; and
 wherein the hub holder includes a hub support configured to support the front wheel hub and a hub stop adapted to engage behind the front wheel hub on a side thereof facing away from the tire support;
 wherein the carrier forms a fork in a region of the tire support configured to laterally secure the front wheel of the towed bicycle; and
 wherein the fork has two fork arms each having a respective length, one of the fork arms forming the hub holder and the length thereof being at least twice the length of the other of the fork arms.

11. The device according to claim 10, wherein the fork has stop plates facing the front wheel of the towed bicycle laterally securing the front wheel of the towed bicycle.

12. The device according to claim 11, wherein one of the fork arms of the fork is connected to the frame attachment on a side opposite the hub holder at an end portion that extends beyond the tire support.

13. The device according to claim 10, wherein one of the fork arms of the fork is connected to the frame attachment on a side opposite the hub holder at an end portion that extends beyond the tire support.

14. The device according to claim 10, wherein the hub holder has a longitudinal guide in which the hub stop is slidably supported so as to be fixably mounted in a selected position.

15. A device for towing a towed bicycle with a towing bicycle, said device comprising:
 a frame attachment configured for connection with the towing bicycle;
 a carrier connected to the frame attachment and comprising a hub holder configured to connect with a front wheel hub of a front wheel of the towed bicycle;
 wherein the carrier forms a tire support configured to support a tire of the front wheel of the towed bicycle; and
 wherein the hub holder includes a hub support configured to support the front wheel hub and a hub stop adapted to engage behind the front wheel hub on a side thereof facing away from the tire support;
 wherein the carrier forms a fork in a region of the tire support configured to laterally secure the front wheel of the towed bicycle; and
 wherein the fork has stop plates facing the front wheel of the towed bicycle and configured to laterally secure the front wheel of the towed bicycle.

16. The device according to claim 15, wherein one of the fork arms of the fork is connected to the frame attachment on a side opposite the hub holder at an end portion that extends beyond the tire support.

17. The device according to claim 15, wherein the hub holder has a longitudinal guide in which the hub stop is slidably supported so as to be fixably mounted in a selected position.

* * * * *